Feb. 8, 1927.
E. R. BORN
POTATO CUTTER
Filed Aug. 29, 1925
1,617,194
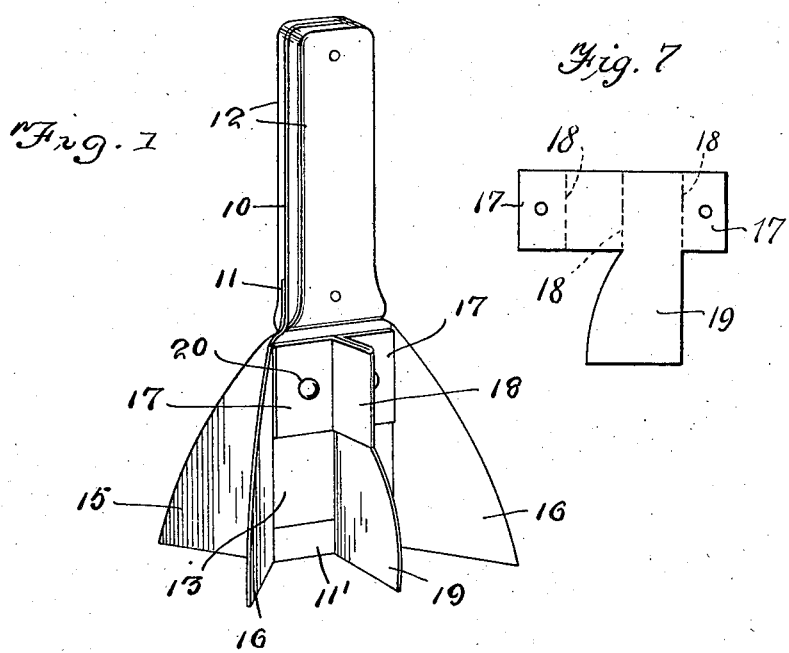
E. R. Born
INVENTOR
BY Victor J. Evans
ATTORNEY
WITNESS:

Patented Feb. 8, 1927.

1,617,194

UNITED STATES PATENT OFFICE.

ERNEST R. BORN, OF HENSEL, NORTH DAKOTA.

POTATO CUTTER.

Application filed August 29, 1925. Serial No. 53,352.

This invention relates to improvements in cutters for culinary use, the general object and utility thereof being in the cutting of spuds for seed potatoes which owing to the construction thereof does not cut the end of the spud or potato whereby sprouts usually forming upon the ends of the spuds or potatoes may not be destroyed.

Another object of my invention is the provision of detachably secured auxiliary cutters which may be arranged upon the side of the original blade in cutting up spuds and potatoes into a greater number of pieces for enhancing and increasing the potato crop in so far as a greater number of seeds may be planted to the number of spuds or potatoes so cut up and prepared.

With the above and other objects in view, the invention further includes novel features and details of construction, to be hereinafter fully described, illustrated in the accompanying drawings and pointed out in the appended claims.

In the drawings:

Figure 1 is a perspective of my invention.

Figure 2 is a horizontal section taken therethrough.

Figure 3 is a similar view with the side blades removed.

Figure 4 is a perspective of the detachable side cutting blade.

Figure 5 is a diagrammatic plan view of a potato and illustrating the manner in which the same may be cut into six pieces.

Figure 6 is a similar view of a potato and illustrating the manner in which a potato may be cut with one end of the cutter in cutting the same into three separate pieces.

Figure 7 is a diagrammatic plan view of an auxiliary cutter.

Referring to the drawings in detail, wherein like characters of reference denote corresponding parts, the reference characters 10 and 11 indicate long and short plates, the plate 11 forms a singular cutting edge below the lower extremity of the plate 10 as indicated at 11', and both of which being secured within a pair of handles 12 and terminating at their lower ends in relatively enlarged blades 13 and 14 having their respective sides terminating in curved outwardly and obliquely disposed edges 15 and 16 respectively.

It will thus be noted from the foregoing description, and accompanying drawings that the cutter thus formed may cut an entire potato or spud into four separate pieces.

Auxiliary cutters formed from a single piece of material are provided and are adapted to be secured to the sides of the plates 13 and 14. These cutters each comprising a flat portion 19, terminating in a cutting edge, and a reversely bent portion 18. The wing 17, has apertures through which pass the bolts 20 for securing the cutters to the plates.

It will thus be noted from the foregoing description and accompanying drawings, that this invention provides an exceedingly useful and advantageous cutter which will be greatly appreciated by farmers because the present method for cutting up spuds and potatoes for planting the new crop does not in any way mangle them nor remove the sprouts therefrom. The blades 15 and 16 are obliquely disposed to eliminate any possibility of cutting off the sprouts which usually form at the ends of the potatoes and will cut the potatoes or spuds evenly and quickly into any desired number of pieces according to the desire of the farmer and the number of eyes in each potato which will add materially in the decrease of labor in the cutting up the potatoes and the buying of greater quantities of spuds and potatoes to be cut in the manner set forth.

The invention is susceptible of various changes in its form, proportion and minor details of construction, and the right is herein reserved to make such changes as properly falls within the scope of the appended claims.

Having thus described my invention, what is claimed is:—

1. A potato cutter, handle members therefor, and cutting portions provided upon the ends and side edges of the cutter.

2. In a potato cutter, a handle member therefor, plates carried by the handle member and forming cutting edges upon their lower ends, and outwardly and obliquely disposed cutting edges formed upon the side edges thereof.

3. A potato cutter of the character described comprising a pair of companion plates having their upper ends secured by the handle members and having cutting edges at their lower end portions, said plates having their side edges extending outwardly and obliquely therefrom to provide additional cutting edges thereon, and auxiliary cutters carried upon the sides of the plates.

4. A potato cutter comprising plate members carried between handle members, said plates terminating to provide cutting edges at their lower ends, the plates further providing outwardly and obliquely disposed cutting edges upon their respective sides, and auxiliary detachably secured cutters forming intermediately bent portions and companion apertured ears for securing the latter to the corresponding outer sides of the plates.

5. A potato cutter of the character described comprising a pair of long and short plates secured between a pair of handle members and terminating to provide a single cutting edge the plates further providing outwardly and obliquely disposed cutting edges at their side edges, auxiliary cutters, and said cutters providing companion oppositely disposed attaching ears for detachably securing the same upon the sides of the plates.

In testimony whereof I affix my signature.

ERNEST R. BORN.